United States Patent
Sugiyama et al.

(10) Patent No.: US 9,929,416 B2
(45) Date of Patent: Mar. 27, 2018

(54) FUEL CELL VEHICLE COOLANT HAVING IMPROVED STORAGE STABILITY AND METHOD FOR PRODUCING THE SAME

(71) Applicant: TOYOTA JIDOSHA KABUSHIKI KAISHA, Toyota-shi, Aichi (JP)

(72) Inventors: Yuichiro Sugiyama, Nagoya (JP); Kazuhiro Miyajima, Okazaki (JP); Youichirou Yoshii, Shizuoka (JP); Nobukazu Takagi, Shizuoka (JP); Tomoyuki Nakano, Fuji (JP); Takumi Otsubo, Shizuoka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/927,577

(22) Filed: Oct. 30, 2015

(65) Prior Publication Data
US 2016/0141646 A1    May 19, 2016

(30) Foreign Application Priority Data
Nov. 14, 2014    (JP) ................. 2014-231701

(51) Int. Cl.
*C09K 3/18*       (2006.01)
*H01M 8/04029*    (2016.01)
(Continued)

(52) U.S. Cl.
CPC .......... *H01M 8/04029* (2013.01); *C09K 5/10* (2013.01); *C09K 5/04* (2013.01); *C09K 5/20* (2013.01);
(Continued)

(58) Field of Classification Search
CPC ... C09K 5/00; C09K 5/02; C09K 5/04; C09K 5/048; C09K 5/20
(Continued)

(56) References Cited

U.S. PATENT DOCUMENTS 7,303,831 B2 * 12/2007 St-Pierre ............. B60L 11/1881
429/438
7,371,334 B2 * 5/2008 Wenderoth .......... B60L 11/1892
252/71
(Continued)

FOREIGN PATENT DOCUMENTS

CN    1926706 A    3/2007
JP    2005-500649 A    1/2005
(Continued)

*Primary Examiner* — Jane L Stanley
(74) *Attorney, Agent, or Firm* — Sughrue Mion, PLLC (57) ABSTRACT

There are provided a stock solution composition for fuel cell vehicle coolant used by dilution with a diluent comprising water and a method for producing the same, and further a fuel cell vehicle coolant composition having improved storage stability and a method for producing the same. The present invention relates to a method for producing a stock solution composition for fuel cell vehicle coolant, wherein the stock solution composition comprises at least one ethylene glycol compound selected from the group consisting of ethylene glycol, diethylene glycol, and triethylene glycol, and is used by dilution with a diluent comprising water, and the method comprises the following steps: (a) a step of selecting as a raw material an ethylene glycol compound having an ethylene glycol monoformate content of 60 ppm or less; or (b) a step of selecting as a raw material an ethylene glycol compound, wherein a 50% by mass aqueous solution of the ethylene glycol compound has a conductivity of 4.5 μS/cm or less after heating.

5 Claims, 5 Drawing Sheets

(51) Int. Cl.
 *C09K 5/10* (2006.01)
 *C09K 5/20* (2006.01)
 *C09K 5/04* (2006.01)

(52) U.S. Cl.
 CPC .......... *H01M 2250/20* (2013.01); *Y02P 70/56* (2015.11); *Y02T 90/32* (2013.01)

(58) Field of Classification Search
 USPC .............................................. 252/70, 71, 73
 See application file for complete search history.

(56) References Cited

U.S. PATENT DOCUMENTS

| | | |
|---|---|---|
| 2004/0028971 A1* | 2/2004 | Wenderoth .......... B60L 11/1892 252/71 |
| 2004/0104375 A1 | 6/2004 | Pellet et al. |
| 2004/0129920 A1 | 7/2004 | Wenderoth et al. |
| 2004/0224201 A1 | 11/2004 | St-Pierre et al. |
| 2007/0075289 A1 | 4/2007 | Egawa et al. |

FOREIGN PATENT DOCUMENTS

| | | |
|---|---|---|
| JP | 2008-59825 A | 3/2008 |
| JP | 2008-59988 A | 3/2008 |
| JP | 2008-59990 A | 3/2008 |
| JP | 2009-73999 A | 4/2009 |
| JP | 2012-9263 A | 1/2012 |
| KR | 10-2005-0084066 A | 8/2005 |

* cited by examiner

Fig. 5 ly, when there is a possibility of use below the
FUEL CELL VEHICLE COOLANT HAVING IMPROVED STORAGE STABILITY AND METHOD FOR PRODUCING THE SAME This application claims priority from Japanese Patent Application Nos. 2014-231701 filed Nov. 14, 2014, the contents of all of which are incorporated herein by reference in their entirety.

BACKGROUND OF THE INVENTION

Field of the Invention

The present invention relates to a stock solution composition for fuel cell vehicle coolant used by dilution with a diluent comprising water and a method for producing the same, and further to a fuel cell vehicle coolant composition having improved storage stability and a method for producing the same.

Background Art

Generally, a stack in a fuel cell vehicle is a stacked structure of a plurality of single cells, and a cooling plate for cooling the stack (single cells) is interposed for each substack composed of several single cells. A coolant path is formed inside the cooling plate, and the stack is cooled by the flow of a coolant through the coolant path. In this manner, the coolant in the fuel cell vehicle is circulated in the stack generating power, that is, between the substacks, and therefore, in order to prevent electrical leakage outside the stack and a decrease in power generation efficiency (reduction in energy loss) caused by the resistance of the coolant, high insulation performance is required. In order to satisfy requirements such as the ensuring of the insulation performance and the ensuring of cooling efficiency, pure water has been used as the coolant in conventional art. But, considering, for example, automotive fuel cells or fuel cells for home cogeneration system, the temperature of the coolant decreases to ambient temperature during non-operation. Particularly, when there is a possibility of use below the freezing point, pure water may freeze to impair the cell performance of the fuel cells, such as the breakage of the cooling plates due to coolant volume expansion.

Because of such circumstances, the use of glycol compounds for the purpose of nonfreezing properties is considered, but even in the case where these are used as the base of a fuel cell vehicle coolant, a problem is that low conductivity cannot be maintained because the conductivity increases. The increase in conductivity during storage before filling to vehicle is a problem for the fuel cell vehicle coolant of which high insulation performance is required in order to prevent electrical leakage to the outside. It has been considered that the increase in the conductivity of the coolant is caused by the oxidative degradation of the glycol compound due to the heat load of the running of the vehicle, and therefore, measures have been taken by the blending of an antioxidant.

For example, JP Patent Publication (Kokai) No. 2008-059990 A, JP Patent Publication (Kokai) No. 2008-059988 A, JP Patent Publication (Kokai) No. 2012-009263 A, and JP Patent Publication (Kokai) No. 2008-059825 A disclose that the oxidative degradation of an aqueous solution of an ethylene glycol compound is inhibited by adding a cycloalkylamine or a derivative thereof (for example, cyclohexylamine) (JP Patent Publication (Kokai) No. 2008-059990 A), thiourea or a derivative thereof (for example, thiourea dioxide) (JP Patent Publication (Kokai) No. 2008-059988 A), a particular aromatic group-containing glycoside compound (for example, salicin) (JP Patent Publication (Kokai) No. 2012-009263 A), or a polyamine (for example, hydrazine) (JP Patent Publication (Kokai) No. 2008-059825 A). However, the effect of inhibiting conductivity increase during long time storage by blending such an antioxidant is not sufficient.

In addition, JP Patent Publication (Kokai) No. 2009-073999 A discloses the use of a nonaqueous solvent having low conductivity such as a fluorine-based solvent. However, the nonaqueous solvent has the following problem: the non nonaqueous solvent has a poor heat exchange efficiency because of its low specific heat, and therefore, an increase in radiator size is required, which is not practical.

As described above, it has been required to find a technique for inhibiting conductivity increase during long time storage in a fuel cell vehicle coolant containing water and a glycol advantageous in terms of cooling efficiency and nonfreezing properties, but this has been in a difficult situation.

SUMMARY OF THE INVENTION

It is an object of the present invention to provide a stock solution composition for fuel cell vehicle coolant used by dilution with a diluent comprising water and a method for producing the same, and further a fuel cell vehicle coolant composition having improved storage stability and a method for producing the same.

The present inventors have found that ethylene glycol monoformate (hereinafter also referred to as EG monoformate) contained as an impurity in an ethylene glycol compound such as ethylene glycol is hydrolyzed by mixing with water during coolant preparation to produce formic acid, and that the formic acid dissociates in the coolant to increase conductivity. Further, the present inventors have found that there is a positive correlation between the conductivity of a coolant after long time storage and EG monoformate content in an ethylene glycol compound or the conductivity of an aqueous solution of an ethylene glycol compound after heating, and arrived at the present invention.

Specifically, the present invention encompasses the following inventions.

(1) A method for producing a stock solution composition for fuel cell vehicle coolant, wherein the stock solution composition comprises at least one ethylene glycol compound selected from the group consisting of ethylene glycol, diethylene glycol, and triethylene glycol, and is used by dilution with a diluent comprising water, and the method comprises the following steps:

(a) a step of selecting as a raw material an ethylene glycol compound having an ethylene glycol monoformate content of 60 ppm or less; or (b) a step of selecting as a raw material an ethylene glycol compound, wherein a 50% by mass aqueous solution of the ethylene glycol compound has a conductivity of 4.5 μS/cm or less after heating.

(2) A stock solution composition for fuel cell vehicle coolant, wherein the stock solution composition is used by dilution with a diluent comprising water, and produced by the method according to (1).

(3) A method for producing a fuel cell vehicle coolant composition, comprising:

the step (a) or (b) according to (1); and (c) a step of mixing the ethylene glycol compound with a diluent, the diluent comprising water and at least one selected from the group consisting of propylene glycol, 1,3-propanediol, 1,3-butanediol, 1,5-pentanediol, and hexylene glycol.

(4) A method for producing a fuel cell vehicle coolant composition, comprising:

(c1) a step of mixing an ethylene glycol compound with a diluent, the diluent comprising water and at least one selected from the group consisting of propylene glycol, 1,3-propanediol, 1,3-butanediol, 1,5-pentanediol, and hexylene glycol; and (d) a step of treating an aqueous solution comprising the ethylene glycol compound using an ion exchange resin to set ethylene glycol monoformate content to 30 ppm or less based on a coolant composition.

(5) A fuel cell vehicle coolant composition produced by the method according to (3) or (4).

(6) The fuel cell vehicle coolant composition according to (5), wherein a content of the ethylene glycol compound is 30 to 70% by mass based on the coolant composition.

(7) The fuel cell vehicle coolant composition according to (5) or (6), having a conductivity of 5.0 μS/cm or less after storage at 40° C. for 2000 hours.

According to the present invention, conductivity increase during long time storage can be inhibited in a fuel cell vehicle coolant containing water and an ethylene glycol compound advantageous in terms of cooling efficiency and nonfreezing properties. According to the present invention, by selecting an ethylene glycol compound having a low EG monoformate content or by removing EG monoformate, a fuel cell vehicle coolant that has a small increase in conductivity even if stored for a long time and has high quality stability can be produced.

DETAILED DESCRIPTION OF THE PREFERRED EMBODIMENTS

The present invention relates to a method for producing a stock solution composition for fuel cell vehicle coolant, wherein the stock solution composition comprises at least one ethylene glycol compound selected from the group consisting of ethylene glycol, diethylene glycol, and triethylene glycol, and is used by dilution with a diluent comprising water (hereinafter also referred to as the method of the present invention). As used herein, simple reference to an ethylene glycol compound means ethylene glycol, diethylene glycol, or triethylene glycol.

It has now been found by the present inventors that EG monoformate contained as an impurity in an ethylene glycol compound such as ethylene glycol is hydrolyzed by mixing with water during coolant preparation to produce formic acid, and the formic acid dissociates in the coolant to increase conductivity. EG monoformate is a substance whose content cannot be controlled at the stage of the synthesis of an ethylene glycol compound such as ethylene glycol in terms of variations in production.

Hydrolysis of EG monoformate $$HO-C_2H_4-O-CHO + H_2O \rightarrow HO-C_2H_4-OH + HCOOH \quad \text{[Formula 1]}$$

The at least one ethylene glycol compound selected from the group consisting of ethylene glycol, diethylene glycol, and triethylene glycol may be one usually used as a raw material of a fuel cell vehicle coolant, and specifically, one having a purity of 99.0% or more can be used. The water contained in the diluent for diluting the stock solution composition for fuel cell vehicle coolant produced by the method of the present invention may be one usually used as a raw material of a fuel cell vehicle coolant, and ion-exchanged water is preferred.

The method of the present invention comprises the following steps:

(a) the step of selecting as a raw material an ethylene glycol compound having an ethylene glycol monoformate content of 60 ppm or less; or (b) the step of selecting as a raw material an ethylene glycol compound, wherein a 50% by mass aqueous solution of ethylene glycol compound has a conductivity of 4.5 μS/cm or less after heating. By comprising the step (a) or (b), the method of the present invention can provide a stock solution composition for fuel cell vehicle coolant that can maintain low conductivity even after long time storage when diluted with a diluent comprising water. Here, the "long time storage" refers to being allowed to stand in a closed container at 40° C. for 2000 hours. In addition, the conductivity of the coolant composition is measured with the liquid temperature adjusted to 25° C.±1° C. unless otherwise described. In addition, when the stock solution composition for fuel cell vehicle coolant obtained by the method of the present invention is used by dilution with a diluent comprising water, the insulation resistance of a vehicle can be maintained even at temperature during running (about 70° C.).

In the above step (a), the EG monoformate content can be measured using a gas chromatograph mass spectrometer (GCMS) as described later in "I: Measurement of EG Monoformate Content." In order to obtain a coolant composition having a lower conductivity after long time storage when diluted with a diluent comprising water, an ethylene glycol compound having a lower EG monoformate content may be selected as a raw material. In one embodiment, by selecting as a raw material an ethylene glycol compound having an EG monoformate content of 60 ppm or less, a coolant composition having a conductivity of 5.0 μS/cm or less after long time storage can be obtained when diluted with a diluent comprising water. In one embodiment, by selecting as a raw material an ethylene glycol compound having an EG monoformate content of 50 ppm or less, a coolant composition having a conductivity of 4.0 μS/cm or less after long time storage can be obtained when diluted with a diluent comprising water.

In the above step (a), an ethylene glycol compound treated with an ion exchange resin may be used as the ethylene glycol compound having an ethylene glycol monoformate content of 60 ppm or less. When an ethylene glycol compound is treated with an ion exchange resin, the ethylene glycol compound may be treated using an ion exchange resin membrane or a fibrous ion exchange resin, or the ethylene glycol compound may be treated by passing it through a column packed with ion exchange resin particles. In addition, it is possible to stir an ethylene glycol compound and an ion exchange resin for a predetermined time and treat the mixed liquid with a PTFE filtration membrane. When an ion exchange resin is used, it is preferable to treat the ion exchange resin with an acid solution (for example, concentrated hydrochloric acid) to remove metal ions adsorbed on the ion exchange resin before treating an ethylene glycol compound.

In the above step (b), the conductivity is measured, after the 50% by mass aqueous solution of the ethylene glycol compound is heated to allow the hydrolysis of EG monoformate to proceed. The heating temperature and the heating time are not particularly limited as long as the EG monoformate is sufficiently hydrolyzed. The conditions can be appropriately determined by those skilled in the art. Specifically, a method as described later in "II: Measurement of Conductivity after Heat Treatment" can be mentioned. In order to obtain a coolant composition having a lower conductivity after long time storage when diluted with a diluent comprising water, an ethylene glycol compound having a lower conductivity after heat treatment may be selected as a raw material. In one embodiment, by selecting as a raw material an ethylene glycol compound having a conductivity of 4.5 μS/cm or less after heat treatment, a coolant composition having a conductivity of 5.0 μS/cm or less after long time storage can be obtained when diluted with a diluent comprising water. In one embodiment, by selecting as a raw material an ethylene glycol compound having a conductivity of 4.1 μS/cm or less after heat treatment, a coolant composition having a conductivity of 3.4 μS/cm or less after long time storage can be obtained when diluted with a diluent comprising water.

In the method of the present invention, an increase in conductivity after long time storage can be inhibited by the step (a) or (b), and therefore, the method of the present invention does not require the step of adding an antioxidant. Therefore, in one embodiment of the present invention, the method of the present invention does not comprise the step of adding an antioxidant. Specific examples of such an antioxidant include cycloalkylamines or derivatives thereof, thiourea or derivatives thereof such as thiourea dioxide, aromatic group-containing glycoside compounds such as salicin, and polyamines such as hydrazine.

The present invention also relates to a stock solution composition for fuel cell vehicle coolant obtained by the method of the present invention (hereinafter also referred to as the stock solution composition of the present invention).

The stock solution composition of the present invention uses as a raw material the ethylene glycol compound selected in the step (a) or (b), and therefore, the conductivity after long time storage, specifically, after storage at 40° C. for 2000 hours, can be maintained at 5.0 μS/cm or less, preferably 4.1 μS/cm or less, when the stock solution composition of the present invention is diluted with a diluent comprising water.

The stock solution composition of the present invention uses as a raw material the ethylene glycol compound selected in the step (a) or (b), and therefore need not comprise an antioxidant for the ethylene glycol compound. Examples of such an antioxidant include those described above in the method of the present invention.

In addition to the ethylene glycol compound, other additives can be blended in the stock solution composition of the present invention as required as long as the effects of the present invention is not impaired.

At least one or more corrosion inhibitors can be contained in the stock solution composition of the present invention in order to effectively inhibit the corrosion of metals used in fuel cells as long as the conductivity is not affected. Examples of the corrosion inhibitor can include any one or a mixture of two or more of phosphoric acids and/or salts thereof, aliphatic carboxylic acids and/or salts thereof, aromatic carboxylic acids and/or salts thereof, triazoles, thiazoles, silicates, nitrates, nitrites, borates, molybdates, and amine salts.

In addition, for example, a pH adjusting agent such as sodium hydroxide or potassium hydroxide, an antifoaming agent, a colorant, or the like can be appropriately added to the stock solution composition of the present invention as long as the conductivity is not affected.

The total amount of the above other additives blended is usually 10 parts by mass or less, preferably 5 parts by mass or less, based on 100 parts by mass of the composition.

The present invention also relates to a method for producing a fuel cell vehicle coolant composition (hereinafter also referred to as a method for producing a coolant composition according to the present invention).

The method for producing a coolant composition according to the present invention comprises the step (a) or (b) described in the method of the present invention, and (c) the step of mixing the ethylene glycol compound with a diluent, the diluent comprising water and at least one selected from the group consisting of propylene glycol, 1,3-propanediol, 1,3-butanediol, 1,5-pentanediol, and hexylene glycol. The method for producing a coolant composition according to the present invention comprises the step (a) or (b) and therefore can provide a fuel cell vehicle coolant composition that can maintain low conductivity even after long time storage.

In the step (a) of the method for producing a coolant composition according to the present invention, in order to obtain a coolant composition having a lower conductivity after long time storage, an ethylene glycol compound having a lower EG monoformate content may be selected as a raw material. In one embodiment, by selecting as a raw material an ethylene glycol compound having an EG monoformate content of 60 ppm or less, a coolant composition having a conductivity of 5.0 μS/cm or less after long time storage can be obtained. In one embodiment, by selecting as a raw material an ethylene glycol compound having an EG monoformate content of 50 ppm or less, a coolant composition having a conductivity of 4.0 μS/cm or less after long time storage can be obtained.

In the step (b) of the method for producing a coolant composition according to the present invention, in order to obtain a coolant composition having a lower conductivity after long time storage, an ethylene glycol compound having a lower conductivity after heat treatment may be selected as a raw material. In one embodiment, by selecting as a raw material an ethylene glycol compound having a conductivity of 4.5 μS/cm or less after heat treatment, a coolant composition having a conductivity of 5.0 μS/cm or less after long time storage can be obtained. In one embodiment, by selecting as a raw material an ethylene glycol compound having a conductivity of 4.1 μS/cm or less after heat treatment, a coolant composition having a conductivity of 3.4 μS/cm or less after long time storage can be obtained.

The propylene glycol, 1,3-propanediol, 1,3-butanediol, 1,5-pentanediol, and hexylene glycol used as the diluent in the above step (c) may be those usually used as a raw material of a fuel cell vehicle coolant, and specifically, those having a purity of 99.0% or more can be used. As used herein, propylene glycol, 1,3-propanediol, 1,3-butanediol, 1,5-pentanediol, and hexylene glycol are referred to as other alcohols.

The proportion of water to other alcohols in the above diluent is preferably 10:90 to 90:10 in terms of freezing temperature and cooling performance.

The present invention also relates to a method for producing a fuel cell vehicle coolant composition, comprising (c1) the step of mixing an ethylene glycol compound with a diluent, the diluent comprising water and at least one selected from the group consisting of propylene glycol, 1,3-propanediol, 1,3-butanediol, 1,5-pentanediol, and hexylene glycol; and (d) the step of treating the aqueous solution comprising the ethylene glycol compound using an ion exchange resin to set the ethylene glycol monoformate content to 30 ppm or less based on the coolant composition. As described above, it is important to reduce the amount of EG monoformate in the ethylene glycol compound, a raw material. Therefore, it is considered that EG monoformate is removed from the ethylene glycol compound, a raw material, using an ion exchange resin. In this manner, the ethylene glycol compound itself may be treated, but an aqueous solution of the ethylene glycol compound may be treated. When the aqueous solution is treated with an ion exchange resin, the aqueous solution may be treated using an ion exchange resin membrane or a fibrous ion exchange resin, or the aqueous solution may be treated by passing it through a column packed with ion exchange resin particles. In addition, it is possible to stir the aqueous solution and an ion exchange resin for a predetermined time and treat the mixed liquid with a PTFE filtration membrane. When an ion exchange resin is used, it is preferable to treat the ion exchange resin with an acid solution (for example, concentrated hydrochloric acid) to remove metal ions adsorbed on the ion exchange resin before treating the aqueous solution.

The present invention also relates to a fuel cell vehicle coolant composition obtained by the method for producing a coolant composition according to the present invention (hereinafter also referred to as the coolant composition of the present invention).

The content of the ethylene glycol compound in the fuel cell vehicle coolant composition of the present invention can be arbitrarily adjusted in terms of nonfreezing properties, inflammability, cooling performance, and insulation properties, and is, for example, preferably 30 to 70% by mass, particularly preferably 30 to 60% by mass, based on the composition.

The coolant composition of the present invention uses as a raw material the ethylene glycol compound selected in the step (a) or (b) and therefore has a conductivity of 5.0 μS/cm or less, preferably 4.1 μS/cm or less, after storage at 40° C. for 2000 hours.

The coolant composition of the present invention uses as a raw material the ethylene glycol compound selected in the step (a) or (b) and therefore need not comprise an antioxidant for the ethylene glycol compound. Examples of such an antioxidant include those described above in the method of the present invention.

In addition to the ethylene glycol compound and the diluent, other additives can be blended in the coolant composition of the present invention as required as long as the effects of the present invention is not impaired.

At least one or more corrosion inhibitors can be contained in the coolant composition of the present invention in order to effectively inhibit the corrosion of metals used in fuel cells as long as the conductivity is not affected. Examples of the corrosion inhibitor can include any one or a mixture of two or more of phosphoric acids and/or salts thereof, aliphatic carboxylic acids and/or salts thereof, aromatic carboxylic acids and/or salts thereof, triazoles, thiazoles, silicates, nitrates, nitrites, borates, molybdates, and amine salts.

In addition, for example, a pH adjusting agent such as sodium hydroxide or potassium hydroxide, an antifoaming agent, a colorant, or the like can be appropriately added to the coolant composition of the present invention as long as the conductivity is not affected.

The total amount of the above other additives blended is usually 5 parts by mass or less, preferably 3 parts by mass or less, based on 100 parts by mass of the composition.

EXAMPLES

The present invention will be described in more detail below by way of Examples, but the present invention is not limited to these. As abbreviations, the following are used.

EG: ethylene glycol
DEG: diethylene glycol
PG: propylene glycol
PW: ion-exchanged water (1.0 μS/cm or less)

In these Examples, the measurement of physical property values was performed by the following methods.

<I: Measurement of EG Monoformate Content>

This corresponds to the step (a).

The content of EG monoformate contained in an ethylene glycol compound used for the preparation of each coolant was analyzed using a GCMS [GC6890-MS5973 manufactured by Agilent Technologies]. A standard substance for EG monoformate was not distributed in the market and therefore synthesized by the following method: a synthetic product obtained by mixing potassium formate, chloroethanol, triethylamine, and dimethylamine (DMA) was distilled under reduced pressure at 55° C./5 mmHg, and the remaining dry residue was purified by silica gel chromatography.

<II: Measurement of Conductivity after Heat Treatment>

This corresponds to the step (b).

A 50% by mass aqueous solution of an ethylene glycol compound used for the preparation of each coolant was prepared, and 100 ml of the aqueous solution was heated in a 300 ml closed container at 88° C. for 24 hours. Then, the liquid temperature was adjusted to 25° C., and the conductivity was measured. The conductivity was measured using Personal Conductivity (SC) Meter SC72 and Sensor SC72SN-11 (for pure water) manufactured by Yokogawa Electric Corporation.

<III: Measurement of Conductivity after Long Time Storage Test>

This corresponds to conductivity during storage before filling to vehicle.

250 ml of each coolant was heated in a 300 ml closed container at 40° C. for 2000 hours. Then, the liquid temperature was adjusted to 25° C., and the conductivity was measured. The conductivity was measured using Personal Conductivity Meter SC72 and Sensor SC72SN-11 (for pure water) manufactured by Yokogawa Electric Corporation.

Figure 1:
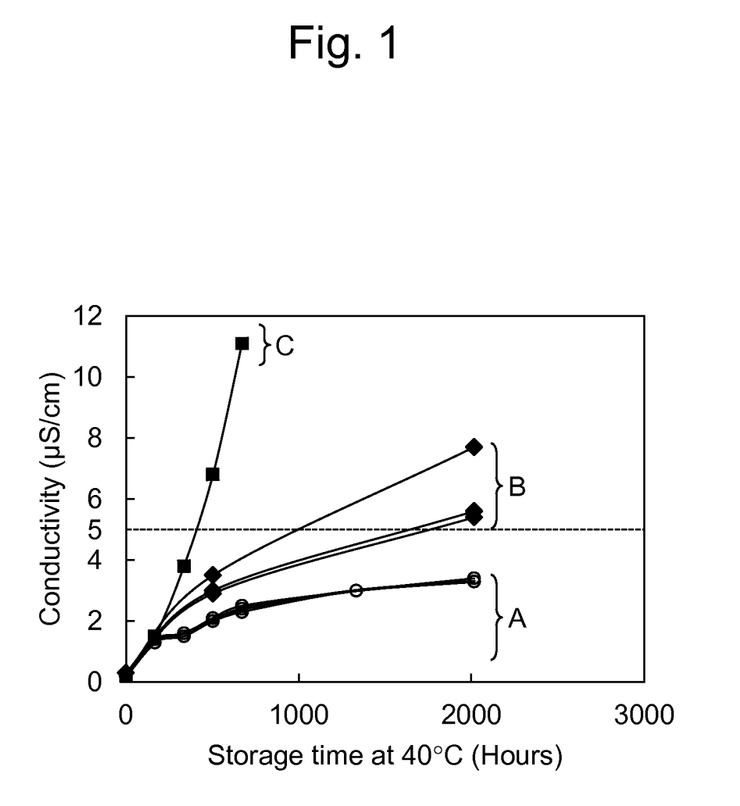
FIG. 1 is a graph showing the relationship between storage time at 40° C. and conductivity for coolants containing an ethylene glycol compound and water.

(1) Conductivity of Coolants Containing Ethylene Glycol Compound and Water after Storage Test FIG. 1 shows the results of a storage test at 40° C. for coolants prepared by using as a raw material ethylene glycol compounds A-C having a different EG monoformate content, and mixing 45 parts by mass of EG, 10 parts by mass of PG, and 45 parts by mass of PW. The A group includes the coolants of Examples 1, 2, and 3 (described below), the B group includes the coolants of Comparative Examples 1, 2, and 3 (described below), and the C group includes the coolant of Comparative Example 4 (described below). For conductivity after the storage test, the liquid temperature was adjusted to 25° C., and the conductivity was measured. The conductivity was measured using Personal Conductivity Meter SC72 and Sensor SC72SN-11 (for pure water) manufactured by Yokogawa Electric Corporation. From the results in FIG. 1, it was found that by reducing the EG monoformate content of the ethylene glycol compound, a raw material, to a certain value or less, the conductivity of the coolant after long time storage was reduced.

Figure 2:
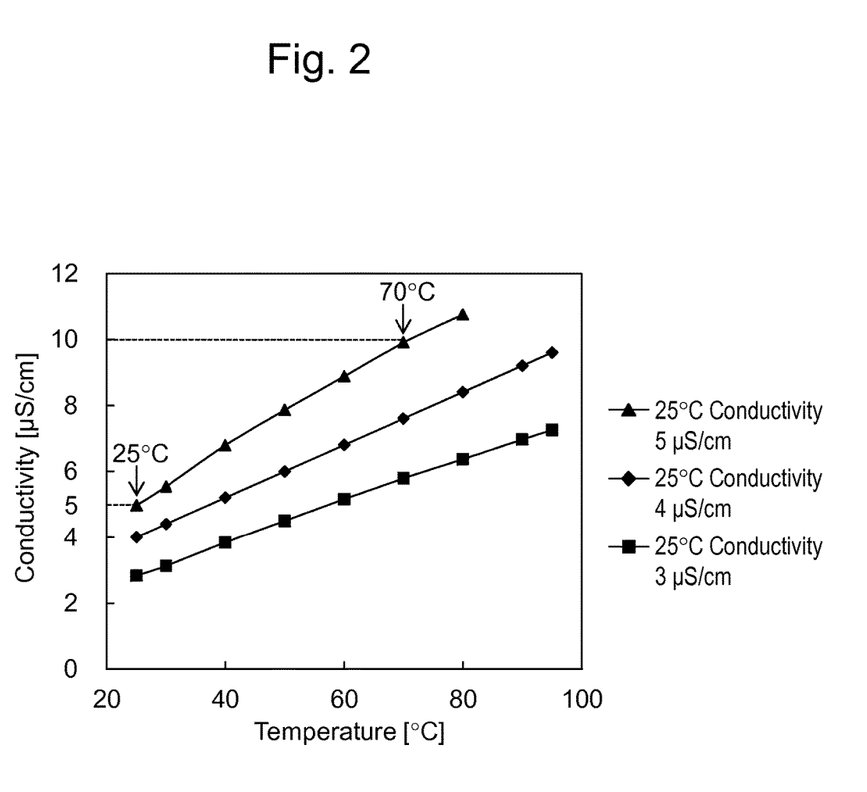
FIG. 2 is a graph showing the relationship between temperature and conductivity for coolants containing an ethylene glycol compound and water.

(2) Relationship Between Temperature and Conductivity for Coolants Containing Ethylene Glycol Compound and Water 45 Parts by mass of EG, 10 parts by mass of PG, and 45 parts by mass of PW were mixed, and formic acid was added to the mixture to prepare coolants having conductivities of 3, 4, and 5 µS/cm at 25° C. The relationship between temperature and conductivity for each coolant is shown in FIG. 2.

The water temperature during the running of a fuel cell vehicle is about 70° C. In addition, in order to maintain the insulation resistance of the vehicle, the conductivity of the liquid is desirably 10 µS/cm or less at the temperature during running. Therefore, from FIG. 2, it was found that in order to satisfy such conditions, a conductivity of 5 µS/cm or less at 25° C. was required. When the result was applied to the above (1), it was found that by using as a raw material an ethylene glycol compound classified into the A group, coolants satisfying the above conditions were obtained. In other words, it is found that with an ethylene glycol compound in the B group and the C group, the conductivity exceeds 5 µS/cm in long time storage, and that when the coolants after such long time storage are used, the conductivity exceeds 10 µS/cm at 70° C. during running.

(3) Relationship Between EG Monoformate Content of Ethylene Glycol Compound and Conductivity after Long Time Storage Test

Examples 1-3 and Comparative Examples 1-3

EG having a different EG monoformate content (Table 1) was used, and 45 parts by mass of EG, 10 parts by mass of PG, and 45 parts by mass of PW were mixed to prepare coolants.

Example 4

EG used in Example 1 was used, and 30 parts by mass of EG and 70 parts by mass of PW were mixed to prepare a coolant.

Comparative Example 4

DEG having an EG monoformate content of 160 ppm was used, and 45 parts by mass of DEG, 10 parts by mass of PG, and 45 parts by mass of PW were mixed to prepare a coolant.

Comparative Example 5

EG used in Comparative Example 1 was used, and 30 parts by mass of EG and 70 parts by mass of PW were mixed to prepare a coolant.

The coolants of Examples 1-4 and Comparative Example 1-5, or the ethylene glycol compounds (EG or DEG) used for the preparation of the coolants were subjected to the analyses and tests of the above I-III. The results are shown in Table 1.

TABLE 1

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| EG monoformate content in glycol compound (ppm) | | 49 | 47 | 51 | 51 | 84 | 106 | 82 | 160 | 84 |
| EG monoformate content in coolant (ppm) | | 22 | 21 | 23 | 15 | 38 | 48 | 37 | 72 | 25 |
| Conductivity after heat treatment (µS/cm) [88° C. × 24 h] | Before test | 0.2 | 0.2 | 0.2 | 0.2 | 0.2 | 0.2 | 0.2 | — | 0.2 |
| | After test | 3.8 | 3.7 | 3.9 | 2.5 | 6.0 | 6.4 | 5.9 | — | 6.0 |
| Conductivity after long time storage test (µS/cm) [40° C. × 2000 h] | Before test | 0.2 | 0.2 | 0.2 | 0.2 | 0.2 | 0.2 | 0.2 | 0.2 | 0.2 |
| | After test | 3.3 | 3.3 | 3.4 | 4.1 | 5.6 | 7.7 | 5.4 | >10 | 6.7 |

From the results for the coolants of Examples 1-3 (EG concentration: 45% by mass), it was found that when EG having an EG monoformate content of 60 ppm or less was used, a coolant having a conductivity of 3.4 µS/cm or less after long time storage was obtained, and that thus the conductivity after long time storage was reduced to 5 µS/cm or less (the insulation resistance of a vehicle was maintained). In addition, also when EG having a conductivity of 3.9 µS/cm or less in the measurement of conductivity after heat treatment was selected and used, similarly, a coolant having a conductivity of 3.4 µS/cm or less after long time storage was obtained, and that thus the conductivity after long time storage was reduced to 5 µS/cm or less (the insulation resistance of a vehicle was maintained).

From the measurement results for the coolant of Example 4 (EG concentration: 30% by mass), it was found that when EG having an EG monoformate content of 51 ppm or less was used, a coolant having a conductivity of 4.1 µS/cm or less after long time storage was obtained, and that thus the conductivity after long time storage was reduced to 5 µS/cm or less (the insulation resistance of a vehicle was maintained). In addition, also when EG having a conductivity of 2.5 µS/cm or less in the measurement of conductivity after heat treatment was selected and used, similarly, a coolant having a conductivity of 4.1 µS/cm or less after long time storage was obtained, and that thus the conductivity after long time storage was reduced to 5 µS/cm or less (the insulation resistance of a vehicle was maintained).

From the results for the coolants of Comparative Examples 1-5 (EG concentration: 45% by mass or 30% by mass), it was found that when EG having an EG monoformate content of 80 ppm or more was used, the conductivity after the long time storage test was 5.4 µS/cm or more and did not satisfy 5 µS/cm or less, and that thus the insulation resistance of a vehicle could not be maintained.

Compared to the coolant of Example 1 (EG concentration: 45% by mass), the coolant of Example 4 (EG concentration: 30% by mass) resulted in a higher conductivity after the long time storage test, though the coolant of Example 4 had a lower EG monoformate content in the coolant. The reason for this is considered as follows: as the concentration of the ethylene glycol compound becomes lower, the degree of dissociation of formic acid, a hydrolysis product of EG monoformate, becomes higher, and the conductivity increases. This is also supported by the fact that compared to the coolant of Example 3 (EG concentration: 45% by mass), the coolant of Comparative Example 5 (EG concentration: 30% by mass) having a higher EG monoformate content in the ethylene glycol compound has a higher conductivity after the long time storage test, though they have substantially the same EG monoformate content in the coolant. Therefore, it was found that the conductivity after the long time storage test needed to be regulated by the EG monoformate content in the ethylene glycol compound used for coolant preparation.

Figure 3:
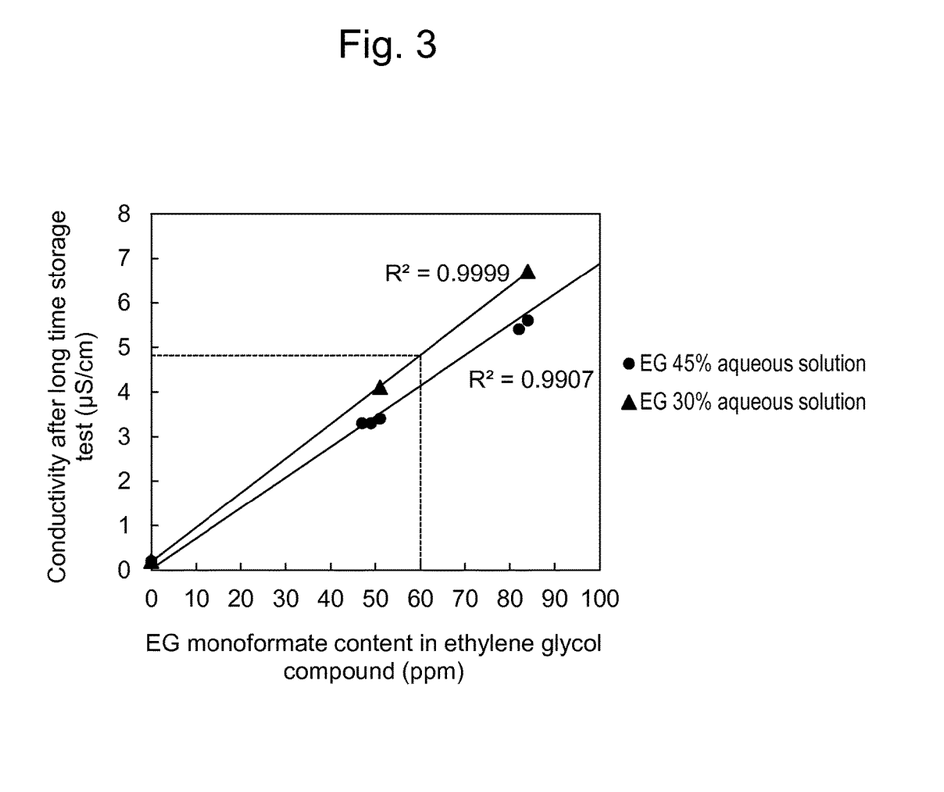
FIG. 3 is a graph showing the relationship between EG monoformate content in an ethylene glycol compound and conductivity after a long time storage test.

FIG. 3 shows the relationship between the EG monoformate content in the ethylene glycol compound used and the conductivity after the long time storage test for the coolants obtained in Examples 1-4 and Comparative Examples 1, 3, and 5.

From the results in FIG. 3, it was found that there was a positive correlation between the EG monoformate content in the ethylene glycol compound and the conductivity after the long time storage test. In other words, it was found that a fuel cell vehicle coolant having a small increase in conductivity could be produced by selecting and using an ethylene glycol compound used for the preparation of the coolant based on measurement of an EG monoformate content using a GCMS as described above in "I: Measurement of EG Monoformate Content." Specifically, when it is desired to set the conductivity after the long time storage test to 5.0 µS/cm or less, an ethylene glycol compound having an EG monoformate content of 60 ppm or less should be selected and used.

Figure 4:
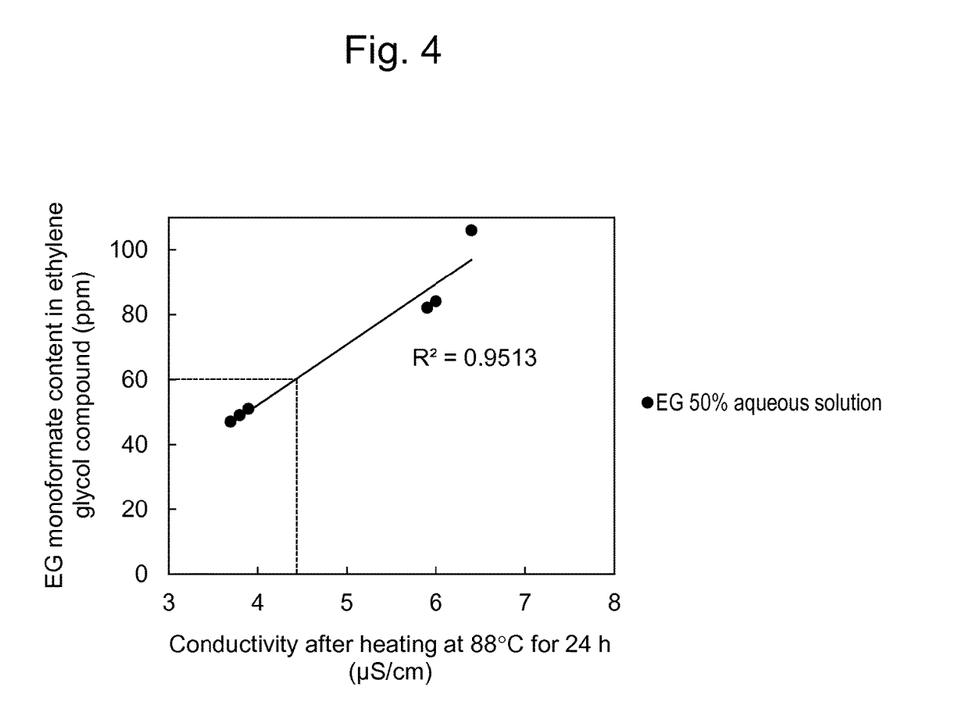
FIG. 4 is a graph showing the relationship between conductivity after heat treatment and EG monoformate content in an ethylene glycol compound.

FIG. 4 shows the relationship between the conductivity after heat treatment and the EG monoformate content in the ethylene glycol compound for the coolants obtained in Examples 1-3 and Comparative Examples 1-3.

From the results in FIG. 4, it was found that there was a positive correlation between the conductivity after heat treatment (88° C.×24 hours) and the EG monoformate content in the ethylene glycol compound. In other words, it was found that a fuel cell vehicle coolant having a small increase in conductivity could be produced by selecting and using an ethylene glycol compound used for the preparation of the coolant based on measurement of an EG monoformate content using a GCMS after heat-treating an aqueous solution of a glycol to allow a hydrolysis reaction to proceed in a short period as described above in "II: Measurement of Conductivity after Heat Treatment." Specifically, when it is desired to set the conductivity after the long time storage test to 5.0 µS/cm or less, an ethylene glycol compound having a conductivity of 4.5 µS/cm or less after heating at 88° C. for 24 hours should be selected and used.

From the above, it was found that by controlling the EG monoformate content, a coolant having any long time storage quality was obtained.

(4) Removal of EG Monoformate with Ion Exchange Resin

This corresponds to the step (c).

Example 5

45 parts by mass of EG, 10 parts by mass of PG, and 45 parts by mass of PW were mixed, and the mixture was subjected to the treatment of two passages through an ion exchanger [DIAION SA10A manufactured by Mitsubishi Chemical Corporation] to obtain a coolant.

Example 6

A coolant was obtained as in Example 5 except that the treatment of five passages through the ion exchanger was performed.

Example 7

A coolant was obtained as in Example 5 except that the treatment of 10 passages through the ion exchanger was performed.

Example 8

A coolant was obtained as in Example 5 except that the treatment of 15 passages through the ion exchanger was performed.

Comparative Example 6

A coolant was obtained as in Example 5 except that the treatment of passage through the ion exchanger was not performed.

250 ml of each coolant was heated in a 300 ml closed container at 40° C. for 0, 96, 168, 336, and 500 hours. Then, the liquid temperature was adjusted to 25° C., and the conductivity was measured. The conductivity was measured using Personal Conductivity Meter SC72 and Sensor SC72SN-11 (for pure water) manufactured by Yokogawa Electric Corporation.

Figure 5:
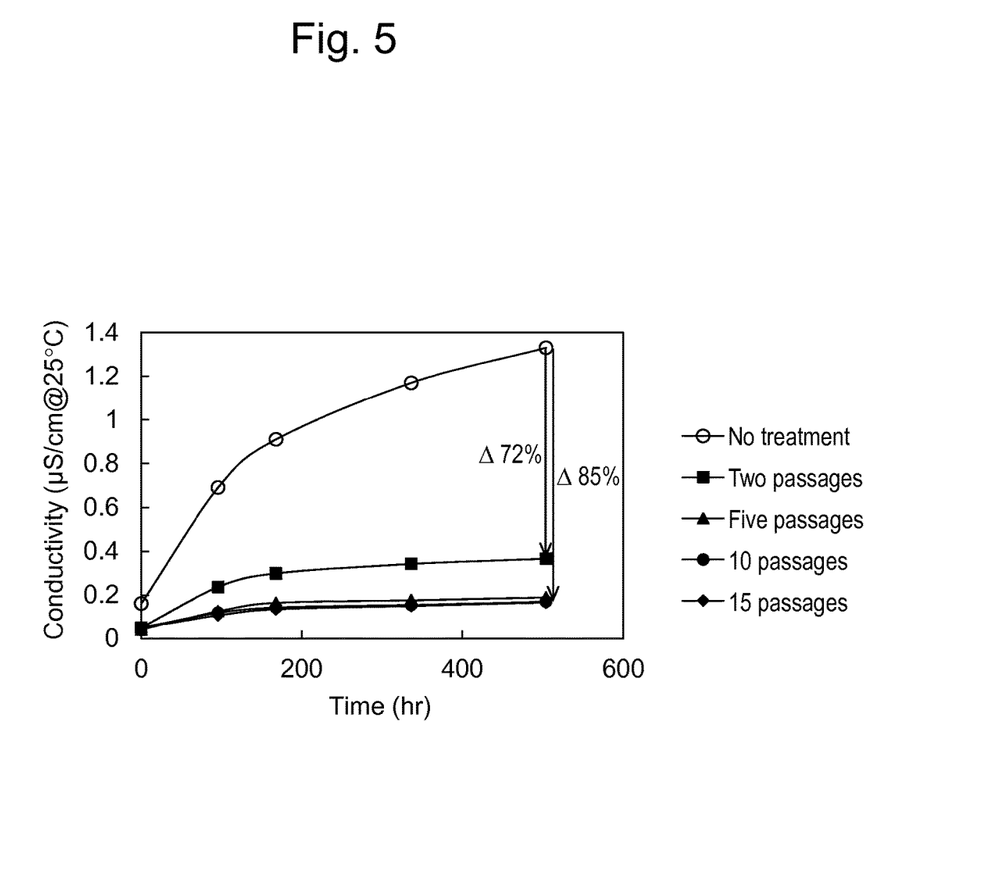
FIG. 5 is a graph showing the effect of inhibiting conductivity increase by passage through an ion exchanger.

From FIG. 5, it is found that even if EG monoformate is removed with an ion exchange resin after an ethylene glycol compound and water are mixed, a coolant that can maintain low conductivity after long time storage is obtained.

The stock solution composition and coolant composition of the present invention are preferably used for the cooling of fuel cells, particularly automotive fuel cells.

What is claimed is:

1. A method for producing a stock solution composition for fuel cell vehicle coolant, wherein the stock solution composition comprises at least one ethylene glycol, and is used by dilution with a diluent comprising water, and the method comprises the following steps:
    obtaining an ethylene glycol selected from the group consisting of ethylene glycol, diethylene glycol, and triethylene glycol;
    determining an ethylene glycol monoformate content of the ethylene glycol; and (a) selecting, as a raw material for the stock solution, ethylene glycol having an ethylene glycol monoformate content of 60 ppm or less.

2. A method for producing a fuel cell vehicle coolant composition, comprising:
   a step of diluting a stock solution composition for fuel cell vehicle coolant produced by the method according to claim 1 with a diluent comprising water.

3. A method for producing a fuel cell vehicle coolant composition, comprising:
   the following steps:
   obtaining an ethylene glycol selected from the group consisting of ethylene glycol, diethylene glycol, and triethylene glycol,
   determining an ethylene glycol monoformate content of the ethylene glycol,
   (a) selecting, as a raw material for the coolant composition, an ethylene glycol having an ethylene glycol monoformate content of 60 ppm or less, and
   (c) a step of mixing the selected ethylene glycol with a diluent, the diluent comprising water and at least one selected from the group consisting of propylene glycol, 1,3-propanediol, 1,3-butanediol, 1,5-pentanediol, and hexylene glycol.

4. A method for producing a stock solution composition for fuel cell vehicle coolant, wherein the stock solution composition comprises at least one ethylene glycol, and is used by dilution with a diluent comprising water, and the method comprises the following steps:
   obtaining an ethylene glycol selected from the group consisting of ethylene glycol, ditheylene glycol, and triethylene glycol; and
   (b) selecting as a raw material for the stock solution an ethylene glycol, wherein a 50% by mass aqueous solution of the ethylene glycol will have a conductivity of 4.5 μS/cm or less after heating at 88° C. for 24 hours.

5. A method for producing a fuel cell vehicle coolant composition, comprising:
   the following steps:
   obtaining an ethylene glycol selected from the group consisting of ethylene glycol, diethylene glycol, and triethylene glycol;
   (b) selecting as a raw material for the coolant composition an ethylene glycol, wherein a 50% by mass aqueous solution of the ethylene glycol will have a conductivity of 4.5 μS/cm or less after heating at 88° C. for 24 hours, and
   (c) a step of mixing the selected ethylene glycol compound with a diluent, the diluent comprising water and at least one selected from the group consisting of propylene glycol, 1,3-propanediol, 1,3-butanediol, 1,5-pentanediol, and hexylene glycol.

* * * * *